United States Patent
Wurst et al.

[11] Patent Number: 6,162,998
[45] Date of Patent: Dec. 19, 2000

[54] APPARATUS FOR WEIGHING HARD GELATINE CAPSULES OR THE LIKE

[75] Inventors: Reiner Wurst, Auenwald; Werner Runft, Winnenden, both of Germany

[73] Assignee: Robert Bosch GmbH, Stuttgart, Germany

[21] Appl. No.: 09/283,748

[22] Filed: Apr. 2, 1999

[30] Foreign Application Priority Data

Apr. 30, 1998 [DE] Germany .......................... 198 19 395

[51] Int. Cl.[7] .......................... G01G 19/00; G01G 13/00; B07C 5/00; B07C 5/16
[52] U.S. Cl. .......................... 177/145; 221/222; 221/277; 209/592; 209/596
[58] Field of Search .......................... 177/145; 221/222, 221/231, 237, 265, 277; 209/592, 596

[56] References Cited

U.S. PATENT DOCUMENTS

| | | | |
|---|---|---|---|
| 2,818,173 | 12/1957 | Powell | 209/296 |
| 2,818,174 | 12/1957 | Powell | 209/296 |
| 4,811,802 | 3/1989 | Yamamoto et al. | 177/50 |
| 5,022,532 | 6/1991 | D'Urso | 177/145 |
| 5,135,113 | 8/1992 | Mayer et al. | 209/592 |
| 5,796,051 | 8/1998 | Chiari et al. | 177/145 |
| 5,852,259 | 12/1998 | Yanase | 177/145 |

OTHER PUBLICATIONS

PCT W) 97/31244 International Publication Date Aug. 28, 1997; International Patent Classification G01G 17/00; Entitled: Apparatus for Weighing Small Articles Such as Gelatine Capsules; International Patent Classification No. PCT/EP97/00739; 16 pages and International Search Report; 2 figures.

*Primary Examiner*—Randy W. Gibson
*Attorney, Agent, or Firm*—Ronald E. Greigg; Edwin E. Greigg

[57] ABSTRACT

An apparatus for weighing hard gelatine capsules or the like has a feed conduit and a discharge conduit, as well as a weighing receptacle that is disposed between them with virtually no cap. By means of a pawl, whichever of the lowermost hard gelatine capsule or the like is released in the feed conduit and pushed over onto the weighing receptacle by a lever can be pivoted into the feed conduit. A vane wheel is also present, whose vanes engages the feed conduit, the weighing receptacle and the discharge conduit and thereby form virtually closed-off transport chambers, each for one hard gelatine capsule or the like.

12 Claims, 1 Drawing Sheet

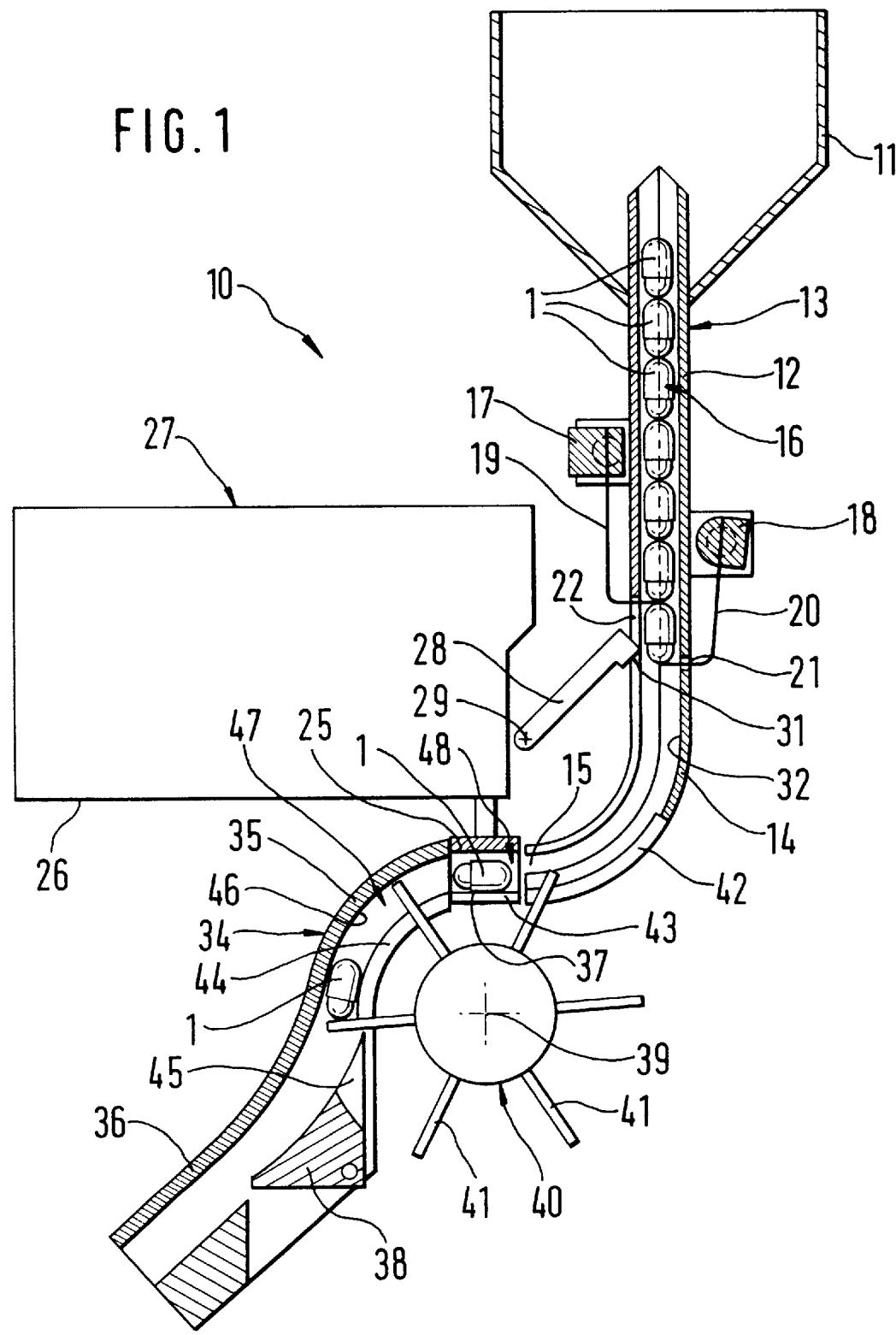

APPARATUS FOR WEIGHING HARD GELATINE CAPSULES OR THE LIKE

BACKGROUND OF THE INVENTION

The invention relates to an apparatus for weighing hard gelatine capsules or the like as generically defined herein and as known for instance from German Patent Disclosure DE 44 19 488 A1. Above a weighing cell that has a weighing receptacle, the known weighing apparatus has a clamping wheel with recesses for the hard gelatine capsules. The hard gelatine capsules are pushed from a capsule delivery tube to between the recesses of the clamping wheel by means of a pusher. After a 90° rotation about the horizontal pivot axis of the clamping wheel, the hard gelatine capsules are pushed out of the recess in the clamping wheel over onto the weighing receptacle by a lever that can be pivoted into the recess in the clamping wheel, so that they can be weighed. A disadvantage of the known apparatus is that the engineering effort and expense for the clamping wheel is relatively high. Also, the hard gelatine capsules are mechanically stressed by being pushed into and out of the recess. If the apparatus is intended to handle hard gelatine capsules of a different size or diameter, it is also necessary that at least the recesses be replaced with others. Furthermore, the known clamping wheel can be used only for elastic capsules; it is not possible to transfer rigid tablets or the like. Finally, during transport in the clamping wheel, manipulation and external intervention are possible, since the hard gelatine capsules are virtually freely accessible in the direction of their insertion into the recesses.

OBJECT AND SUMMARY OF THE INVENTION

The apparatus for weighing hard gelatine capsules or the like according to the invention has the advantage over the prior art of being very simple in design. Moreover, the feed conduit and the vanes of the cell wheel form a transport chamber that leads to automatic guidance of the hard gelatine capsules, and thus makes external intervention during transport and weighing impossible. As a result, the apparatus is also extremely safe in operation. The apparatus of the invention is also virtually size-independent, and even other pharmaceutical products, such as tablets, can also be processed with it.

A simplified pushover of the hard gelatine capsules from the feed conduit onto the weighing receptacle can be attained, regardless of where the hard gelatine capsules are located in the feed conduit, by means of a pushover element. Also because of the pushover element, the cell wheel can be made relatively small, since its vanes need not dip into the feed conduit until at a relatively close distance to the weighing receptacle.

It is also especially advantageous if the cell wheel and the discharge conduit form a further transport chamber for the hard gelatine capsules. As a result, it also becomes possible to imprison the previously weighed hard gelatine capsule, while the next hard gelatine capsule is already being transferred onto the weighing receptacle. As a result, the capacity of the apparatus is increased, because calculating the outcome of weighing and resetting a rejection shunt downstream of the cell wheel can be done while the next hard gelatine capsule is already being weighed. Imprisoning the hard gelatine capsule that has already been weighed also makes it possible to connect the rejection shunt directly to the cell wheel, so that the apparatus takes up less space.

The invention will be better understood and further objects and advantages thereof will become more apparent from the ensuing detailed description of a preferred embodiment taken in conjunction with the drawing.

BRIEF DESCRIPTION OF THE DRAWING

FIG. 1, in a simplified longitudinal section, shows an apparatus according to the invention for weighing hard gelatine capsules or the like.

DESCRIPTION OF THE PREFERRED EMBODIMENT

The apparatus 10, shown in FIG. 1, for weighing hard gelatine capsules 1 or the like has a reservoir 11 for the hard gelatine capsules 1, into whose bottom region a vertically disposed portion 12 of a feed conduit 13 discharges. The portion 12 is adjoined by a quarter-circle-shaped curved portion 14, so that the outlet 15 from the curved portion is located in a horizontal plane. The feed conduit 13 serves to separate the hard gelatine capsules 1 from the reservoir 11 in such a way that the hard gelatine capsules 1 are arranged in a row 16 in the portion 12. It should be noted at this point that in FIG. 1 only one feed conduit 13 is shown. The apparatus 10 has many such feed conduits 13, however, for instance ten of them, all disposed parallel to one another or in other words perpendicular to the plane of the drawing.

On each of the opposed sides of the portion 12 of the feed conduit 13, there is a respective latching device 17, 18, whose pivotable pawls 19, 20 can reach through a hole 21 or slit 22 into the interior of the portion 12. The two cooperating pawls 19, 20 make it possible, in a manner known per se, to release whichever is the lowermost hard gelatine capsule 1 of the row 16.

A weighing receptacle 25 is oriented in alignment with, and with virtually no gap from, the outlet 15 of the curved portion 14. The weighing receptacle 25, disposed in suspended fashion, protrudes from the underside 26 of a weighing cell 27, which furnishes one suitable weighing receptacle 25 for each feed conduit 13.

Between the weighing cell 27 and the curved portion 14, there is a pivotable insertion lever 28, with a pushing face 31 for the hard gelatine capsule 1. The pivot point 29 of the insertion lever 28 is approximately vertically above the outlet 15 from the curved portion 14. The thickness and length of the lever 28 is such that upon a pivoting motion into the slit 22 of the bottom portion 14, the slit being oriented toward the lever 28, the slit plunges farther and farther until it virtually reaches the inside 32 of the curved portion 14 remote from the lever 28.

The weighing receptacle 25 is adjoined, again virtually without any gap, by a discharge conduit 34. The discharge conduit 34 is divided into two portions 35, 36. The first portion 35 is approximately the shape of a quarter circle; that is, from the horizontally disposed bearing face 37 of the weighing receptacle 25, it leads in a downward-pointing direction. In the second portion 36, whose curvature again points out of the vertical direction into a more horizontally inclined direction, there is a pivotable rejection shunt 38, which depending on its position either transfers the previously weighed hard gelatine capsule 1 to a container, not shown, for good capsules, or shunts it to another container, also not shown, for rejected capsules.

Vertically below the weighing receptacle 25 is a horizontally arranged pivot axis 39 of a vane wheel 40 that can be driven counterclockwise. The vane wheel 40, in this exemplary embodiment, has six pinlike vanes 41 spaced apart at regular angles. The vanes 41 of the vane wheel 40 are aligned with the curved portion 14, the weighing receptacle 25, and the first portion 35. The width of the vanes 41 is such that upon a rotation of the vane wheel 40 they plunge into the curved portion 14, the weighing receptacle 25, and the first portion 35. To that end, the aforementioned components have longitudinal slits 42, 43, 44 on the side toward the vanes 41.

So that the rejection shunt 38 can be placed as close as possible to the vane wheel 40, the shunt 38 also has a slitlike milled recess 35, through which the vanes 41 protrude upon a rotation.

The length of the vanes 41 and the disposition of the pivot axis 39 of the vane wheel 40 is such that in the region of the first portion 35 of the discharge conduit 34, the vanes 41 extend to near the inner wall 46, remote from the vane wheel 40, of the first portion 35, so that a first transport chamber 47 for one hard gelatine capsule 1 is created by two successive vanes 41 inside the first portion 36, together with the portion 35. Two successive vanes 41, located on either side of the weighing receptacle 25, also form a second, virtually closed transport chamber 48 for one hard gelatine capsule 1.

The apparatus described above functions as follows: From among the hard gelatine capsules 1 present in a row 16 in the feed conduit 13, whichever hard gelatine capsule 1 is the lowermost one is released by the pawl 20. This capsule slides by its own weight and by gravity into the curved portion 14, where it comes to rest, depending on its size and shape, on the radius of curvature of the curved portion 14, and on friction conditions. At the same time or just before this, the vane 41 of the vane wheel 40 that is leading ahead of the applicable hard gelatine capsule 1 is rotated, in such a way that it is located in the curved portion 14 or in the weighing receptacle 25, or already in the first portion 35, and forms a front stop for the hard gelatine capsule 1. At the same time, however, this same vane 41 and the vane 41 that trails after the hard gelatine capsule 1 are not yet in engagement with the curved portion 14. The insertion lever 28, which had been pivoted out of the way earlier, is now pivoted into the curved portion 14, and its front pushing face 31 pushes the hard gelatine capsule 1 onto the bearing face 37 of the weighing receptacle 25 (possibly in the course of further rotation of the vane 41 leading ahead of the hard gelatine capsule 1). At this time the vane 41 trailing the hard gelatine capsule 1 is still not yet located inside the curved portion 14, to allow the ensuing pivoting of the lever 28 to its original position. Once the lever 28 has pivoted back again by a certain angle is the vane wheel 40 rotated onward in such a way that the vane 41 trailing the hard gelatine capsule 1 reaches the inside of the curved portion 14, and thus forms the second transport chamber 48 for the hard gelatine capsule 1. In this position, shown in FIG. 1, the hard gelatine capsule 1 is enclosed between the vanes 41 of the vane wheel 40, and so external manipulation or intervention is not possible. At the same time, the previously weighed hard gelatine capsule 1 is still located inside the first transport chamber 47, in the region of the discharge conduit 34.

Once the hard gelatine capsule 1 has been weighed by the weighing cell 27, the vane wheel 40 is rotated onward, and the vane 41 trailing the weighed hard gelatine capsule 1 penetrates the longitudinal slit 43 of the weighing receptacle 25, and in the process pushes the hard gelatine capsule 1 out of the weighing receptacle 25 over into the discharge conduit 34. At this moment, when the hard gelatine capsule 1 leaves the weighing receptacle 25, the outcome of the weighing does not yet have to be known, because the hard gelatine capsule 1 is enclosed or imprisoned in the region of the first transport chamber 47. During the pushover from the weighing receptacle 25, however, the next hard gelatine capsule 1 is already being released from the pawl 20, and the events are repeated as described. As soon as it is known whether the weight of the weighed hard gelatine capsule 1 is within the tolerance, the rejection shunt 38 is adjusted accordingly, so that upon a further rotation of the vane wheel 40, the first transport chamber 47 opens and in the process releases the hard gelatine capsule 1 into the discharge conduit 34.

It will additionally be noted that depending on the geometric relationships and sizes of the hard gelatine capsule 1, the apparatus 10 can also function without the insertion lever 28. In that case, where the hard gelatine capsule 1 rests in the curved portion 14, the trailing vane 41 of the vane wheel 40 pushes the hard gelatine capsule 1 onto the weighing receptacle 25. Thus by means of the insertion lever 28, the apparatus can be used without modifications for the most various capsule sizes and the most various embodiments of the feed conduit 13 and serves to increase operating safety, since regardless of precisely where the hard gelatine capsule 1 is resting in the curved portion 14, the lever 18 automatically engages the hard gelatine capsule 1 and pushes it over. By comparison, in a version without a pushover lever 28, the hard gelatine capsules 1 come to rest in the curved portion 14 in a certain region, so that they can in fact be engaged by the trailing vane 41.

The foregoing relates to a preferred exemplary embodiment of the invention, it being understood that other variants and embodiments thereof are possible within the spirit and scope of the invention, the latter being defined by the appended claims.

We claim:

1. An apparatus (10) for weighing hard gelatine capsules (1) comprising a weighing cell (27) with a weighing receptacle (25), a feed conduit (13) for forming a row (16) of hard gelatine capsules (1), a discharge conduit (34) with a rejection shunt (38), which adjoins the weighing receptacle (25), and a transfer device for transferring the hard gelatine capsules (1) from the feed conduit (13) onto the weighing receptacle (25) and from the weighing receptacle (25) into the discharge conduit (34), the transfer device includes a vane wheel (40), whose vanes (41) engage an outlet of the feed conduit (13), an inlet to the discharge conduit (34), and the weighing receptacle (25) and thereby between respective two vanes (41) form a virtually closed-off transport chamber (48) for the hard gelatine capsules (1).

2. The apparatus according to claim 1, in which for transferring the hard gelatine capsules (1) from the outlet end of the feed conduit (13) to the weighing receptacle (25), a pushover element (28) is provided that cooperates with the vane wheel (40).

3. The apparatus according to claim 2, in which the pushover element is embodied as a pivotable lever (28), whose pivot axis (29) is disposed on a side opposite the vane wheel (40) and outside the feed conduit (13), and that the lever (28), to push the hard gelatine capsules (1) over, passes through a slit (22) embodied in the feed conduit (13).

4. The apparatus according to claim 1, in which the row (16) of hard gelatine capsules (1) is dammed-up in the feed conduit (13) in a downward-pointing portion (12), so that the lowermost hard gelatine capsule (1) is released by a pawl (20) which moves in a direction of the vane wheel (40) under an influence of gravity.

5. The apparatus according to claim 2, in which the row (16) of hard gelatine capsules (1) is dammed-up in the feed conduit (13) in a downward-pointing portion (12), so that the lowermost hard gelatine capsule (1) is released by a pawl (20) which moves in a direction of the vane wheel (40) under an influence of gravity.

6. The apparatus according to claim 3, in which the row (16) of hard gelatine capsules (1) is dammed-up in the feed conduit (13) in a downward-pointing portion (12), so that the lowermost hard gelatine capsule (1) is released by a pawl (20) which moves in a direction of the vane wheel (40) under an influence of gravity.

7. The apparatus according to claim 1, in which the discharge conduit (34) is adapted to the shape or diameter of the vane wheel (40), so that together with the vanes (41) of the vane wheel (40), a further transport chamber (47) for a hard gelatine capsule (1) is formed in the discharge conduit (34), while at the same time the first transport chamber (48) is located in a region of the weighing receptacle (25).

8. The apparatus according to claim 2, in which the discharge conduit (34) is adapted to the shape or diameter of the vane wheel (40), so that together with the vanes (41) of the vane wheel (40), a further transport chamber (47) for a hard gelatine capsule (1) is formed in the discharge conduit (34), while at the same time the first transport chamber (48) is located in a region of the weighing receptacle (25).

9. The apparatus according to claim 3, in which the discharge conduit (34) is adapted to the shape or diameter of the vane wheel (40), so that together with the vanes (41) of the vane wheel (40), a further transport chamber (47) for a hard gelatine capsule (1) is formed in the discharge conduit (34), while at the same time the first transport chamber (48) is located in a region of the weighing receptacle (25).

10. The apparatus according to claim 4, in which the discharge conduit (34) is adapted to the shape or diameter of the vane wheel (40), so that together with the vanes (41) of the vane wheel (40), a further transport chamber (47) for a hard gelatine capsule (1) is formed in the discharge conduit (34), while at the same time the first transport chamber (48) is located in a region of the weighing receptacle (25).

11. The apparatus according to claim 5, in which the discharge conduit (34) is adapted to the shape or diameter of the vane wheel (40), so that together with the vanes (41) of the vane wheel (40), a further transport chamber (47) for a hard gelatine capsule (1) is formed in the discharge conduit (34), while at the same time the first transport chamber (48) is located in a region of the weighing receptacle (25).

12. The apparatus according to claim 6, in which the discharge conduit (34) is adapted to the shape or diameter of the vane wheel (40), so that together with the vanes (41) of the vane wheel (40), a further transport chamber (47) for a hard gelatine capsule (1) is formed in the discharge conduit (34), while at the same time the first transport chamber (48) is located in a region of the weighing receptacle (25).

* * * * *